(12) United States Patent
Chang et al.

(10) Patent No.: US 11,566,545 B2
(45) Date of Patent: Jan. 31, 2023

(54) CAM ACTUATED GAS ADMISSION VALVE WITH ELECTRO-HYDRAULIC TRIM CONTROL

(71) Applicant: Caterpillar Inc., Deerfield, IL (US)

(72) Inventors: David Yu Zhang Chang, Edwards, IL (US); David Todd Montgomery, Edelstein, IL (US); Scott Fiveland, Washington, IL (US); Scott F. Shafer, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 450 days.

(21) Appl. No.: 16/401,765

(22) Filed: May 2, 2019

(65) Prior Publication Data

US 2020/0347754 A1    Nov. 5, 2020

(51) Int. Cl.
| | | |
|---|---|---|
| *F01L 1/24* | (2006.01) | |
| *F01L 1/04* | (2006.01) | |
| *F02D 41/14* | (2006.01) | |

(52) U.S. Cl.
CPC ............. *F01L 1/24* (2013.01); *F01L 1/04* (2013.01); *F02D 41/14* (2013.01); *F01L 2001/2427* (2013.01); *F02D 2200/024* (2013.01)

(58) Field of Classification Search
CPC ....... F01L 1/24; F01L 1/04; F01L 2001/2427; F02D 41/14; F02D 2200/024; F02D 35/023; F02D 41/0085; F02D 19/061; F02D 19/024; F02D 19/0686; F02D 19/10; F02D 19/0647; F02M 63/001; F02M 21/0251
USPC ........................................................ 123/435
See application file for complete search history.

(56) References Cited

U.S. PATENT DOCUMENTS

| | | | |
|---|---|---|---|
| 3,125,085 A | * | 3/1964 | Kauffmann ........ F02M 21/0269 123/527 |
| 6,899,068 B2 | | 5/2005 | Nan et al. |
| 7,404,382 B2 | | 7/2008 | Ling et al. |
| 8,145,405 B2 | * | 3/2012 | De Cristoforo ........... F01L 9/11 123/90.11 |
| 8,381,693 B2 | | 2/2013 | Rust et al. |
| 8,935,078 B1 | | 1/2015 | Lorts |
| 9,435,231 B2 | | 9/2016 | Sengul |
| 2004/0060529 A1 | * | 4/2004 | Nan .......................... F01L 9/10 123/90.12 |
| 2020/0095903 A1 | * | 3/2020 | Sueoka ............... F02D 13/0226 |
| 2020/0200068 A1 | * | 6/2020 | Schock ............... F02D 41/0007 |

FOREIGN PATENT DOCUMENTS

| | | | |
|---|---|---|---|
| CN | 203009094 | 6/2013 | |
| CN | 104500163 B | 6/2017 | |
| EP | 0980475 | 4/2003 | |
| EP | 0980475 B1 | * 4/2003 | ......... F02M 21/0275 |
| EP | 2646659 B1 | 8/2015 | |
| FR | 2548278 | 1/1985 | |
| JP | H04179849 | 6/1992 | |

* cited by examiner

*Primary Examiner* — Scott A Reinbold
(74) *Attorney, Agent, or Firm* — Bookoff McAndrews, PLLC

(57) ABSTRACT

A gas engine is disclosed. The gas engine may include a combustion cylinder. The combustion cylinder may include an intake with an intake valve. The combustion cylinder may include an exhaust with an exhaust valve. The gas engine may include a gas admission valve assembly coupled to the intake. The gas admission assembly may include a trimmable electro-hydraulically actuatable gas admission valve to control a gas flow into the intake.

18 Claims, 5 Drawing Sheets

CAM ACTUATED GAS ADMISSION VALVE WITH ELECTRO-HYDRAULIC TRIM CONTROL

TECHNICAL FIELD

The present disclosure relates generally to a gas admission valve and, more particularly, to a cam actuated gas admission valve with electro-hydraulic trim control for a natural gas engine in a machine.

BACKGROUND

A machine, such as a motor grader machine, may include a transmission coupled to a power source, such as an internal combustion engine to enable the motor grader machine to be repositioned and/or to travel between locations. Additionally, the motor grader machine may include one or more articulated implements to perform one or more functions. For example, the motor grader machine may include a ripper implement to perform a ripping function, a blade implement to perform a blading function, and/or the like.

The internal combustion engine may be a natural gas engine that includes one or more combustion cylinders with one or more corresponding spark plugs and pistons to enable generation of power for moving the motor grader, articulating the articulated implement, and/or the like. The natural gas engine may include a gas admission valve with a pressure adjuster to control an engine air/fuel ratio. For example, the pressure adjuster may enable adjustment of a rate of natural gas inflow to the combustion cylinder relative to an air inflow to the combustion cylinder, thereby controlling the air/fuel ratio. However, the pressure adjuster may not be trimmable to enable cylinder power balancing. For example, air/fuel ratios may not be independently adjustable for each cylinder to enable balanced power output between each cylinder, thereby resulting in imbalanced power output, which may result in inefficient operation, shortened component life span, and/or the like.

One attempt to control a natural gas engine is disclosed in U.S. Pat. No. 8,145,405 that issued to De Cristoforo, et al. on Mar. 27, 2012 ("the '405 patent"). In particular, the '405 patent discloses an "an internal-combustion engine . . . provided with an electronically controlled hydraulic system for variable actuation of the intake valves." However, while the '405 patent may use the electronically controlled hydraulic system for variable actuation of the intake valves, the '405 patent may not achieve independent balancing of power output between different combustion cylinders of a natural gas engine. Moreover, the '405 patent may not account for other factors that may affect power output, such as pressure within the combustion cylinders. Furthermore, the '405 patent may position the variable actuation of the intake valves at a cylinder head of an internal combustion engine, which may result in the variable actuation affecting a total inflow to the combustion cylinder, which may affect operation of the combustion cylinder.

The cam actuated gas admission valve with electro-hydraulic trim control of the present disclosure solves one or more of the problems set forth above and/or other problems in the art.

SUMMARY

According to some implementations, the present disclosure is related to a gas engine. The gas engine may include a combustion cylinder. The combustion cylinder may include an intake with an intake valve. The combustion cylinder may include an exhaust with an exhaust valve. The gas engine may include a gas admission valve assembly coupled to the intake. The gas admission assembly may include a trimmable electro-hydraulically actuatable gas admission valve to control a gas flow into the intake.

According to some implementations, the present disclosure is related to a gas admission valve assembly. The gas admission valve assembly may include an actuation cylinder. The gas admission valve assembly may include a hydraulic piston to be actuated by a cam and disposed in the actuation cylinder. The gas admission valve assembly may include a check valve to supply a hydraulic fluid to a first portion of the actuation cylinder. The gas admission valve assembly may include an electronic controlled valve to remove the hydraulic fluid from the first portion of the actuation cylinder. The gas admission valve assembly may include a fuel supply to supply a fuel to a second portion of the actuation cylinder. The gas admission valve assembly may include an admission valve to remove the fuel from the second portion of the actuation cylinder. The gas admission valve assembly may include an engine control module to control the electronic controlled valve to alter a hydraulic pressure in the first portion of the actuation cylinder and to control whether the admission valve is opened by rotation of the cam.

According to some implementations, the present disclosure is related to a method. The method may include receiving, by an engine control module and from a pressure sensor, information identifying a cylinder pressure of a combustion cylinder in a natural gas engine. The method may include determining, by the engine control module, a deviation of the cylinder pressure from a pre-configured cylinder pressure for the combustion cylinder. The method may include determining, by the engine control module, a control signal based on the deviation of the cylinder pressure from the pre-configured cylinder pressure. The method may include transmitting, by the engine control module, the control signal to actuate an electronic controlled valve of a gas admission valve assembly to alter a rate of natural gas injection via an admission valve of the gas admission valve assembly.

DETAILED DESCRIPTION

This disclosure relates to a cam actuated gas admission valve. The cam actuated gas admission valve has universal applicability to any machine having an internal combustion engine, such as a gas engine or a natural gas engine. Although some implementations are described herein in terms of a motor grader, the implementations apply equally to other types of machines, such as a vehicle, a tractor, a dozer, or other above ground equipment, underground equipment, or marine equipment.

Figure 1:
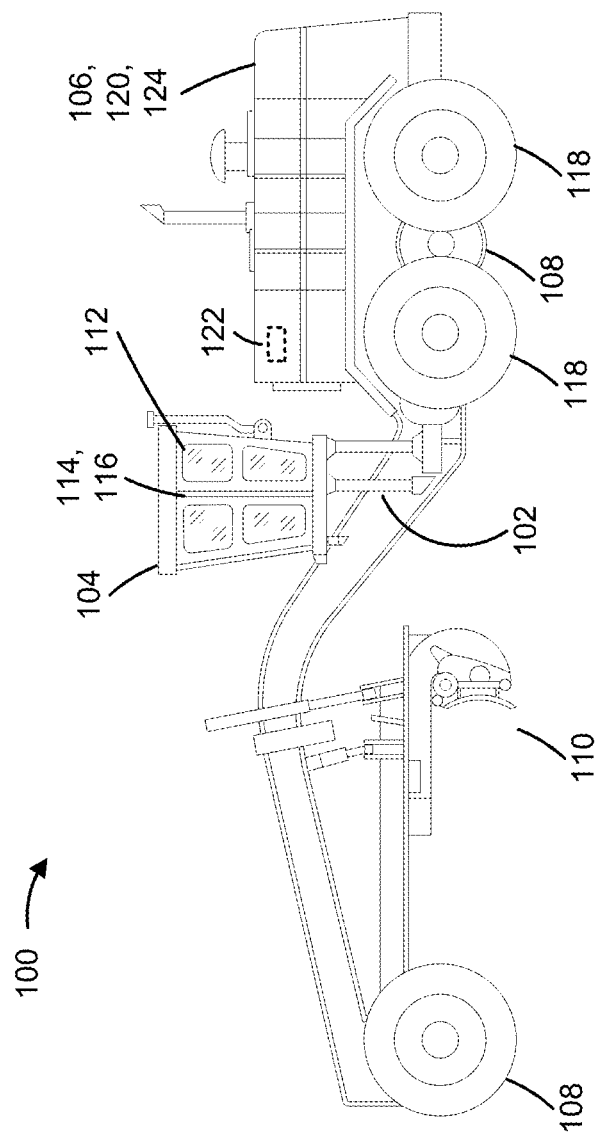
FIG. 1 is a diagram of an example machine that includes a natural gas engine with a cam actuated gas admission valve described herein.

FIG. 1 is a diagram of an example machine 100. The machine 100 is shown as a motor grader but may include any type of machine.

As shown in FIG. 1, machine 100 may have a frame 102 that supports an operator station 104, a power system 106, a drive system 108, and an implement 110. The operator station 104 may include operator controls 112 for operating the machine 100 via the power system 106. The illustrated operator station 104 is configured to define an interior cabin 114 within which the operator controls 112 are housed and which is accessible via a door 116.

The power system 106 is configured to supply power to the machine 100. The power system 106 may be operably arranged with the operator station 104 to receive control signals from the operator controls 112 in the operator station 104. Additionally, or alternatively, the power system 106 may be operably arranged with the drive system 108 and/or the implement 110 to selectively operate the drive system 108 and/or the implement 110 according to control signals received from the operator controls 112.

The power system 106 may provide operating power for the propulsion of the drive system 108 and/or the operation of the implement 110. The power system 106 may include an engine 120 and a transmission. The engine 120 may be any type of engine suitable for performing work using the machine 100, such as an internal combustion engine, a diesel engine, a gasoline engine, a gaseous fuel-powered engine, a natural gas engine, and/or the like. The power system 106 may include an engine control module 122 to control the engine 120 and a gas admission valve assembly 124 thereof. For example, the engine control module 122 may selectively operate valves of the gas admission valve assembly 124 to control the engine 120, as described in more detail herein. The transmission may transfer power from the engine to the drive system 108 and/or the implement 110. The transmission may provide a number of gear ratios that enable the machine 100 to travel at a relatively wide range of speeds and/or conditions via the drive system 108, and/or that enable the use of the implement 110 to perform work.

The drive system 108 may be operably arranged with the power system 106 to selectively propel the machine 100 in accordance with control signals from the operator controls 112 and/or the engine control module 122. The drive system 108 can include a plurality of ground-engaging members, such as wheels 118, as shown, which can be movably connected to the frame 102 through axles, drive shafts, and/or other components. In some implementations, the drive system 108 may be provided in the form of a track-drive system, a wheel-drive system, or any other type of drive system configured to propel the machine 100.

The implement 110 may be operably arranged with the power system 106 such that the implement 110 is movable through control signals transmitted from the operator controls 112 to the power system 106. Other embodiments can include any other suitable implement for a variety of tasks, including, for example, ripping, dozing, brushing, compacting, grading, lifting, loading, plowing, and/or the like. Example implements include rippers, dozers, augers, buckets, breakers/hammers, brushes, compactors, cutters, forked lifting devices, grader bits and end bits, grapples, and/or the like.

As indicated above, FIG. 1 is provided as an example. Other examples are possible and may differ from what is described in connection with FIG. 1.

Figure 2:
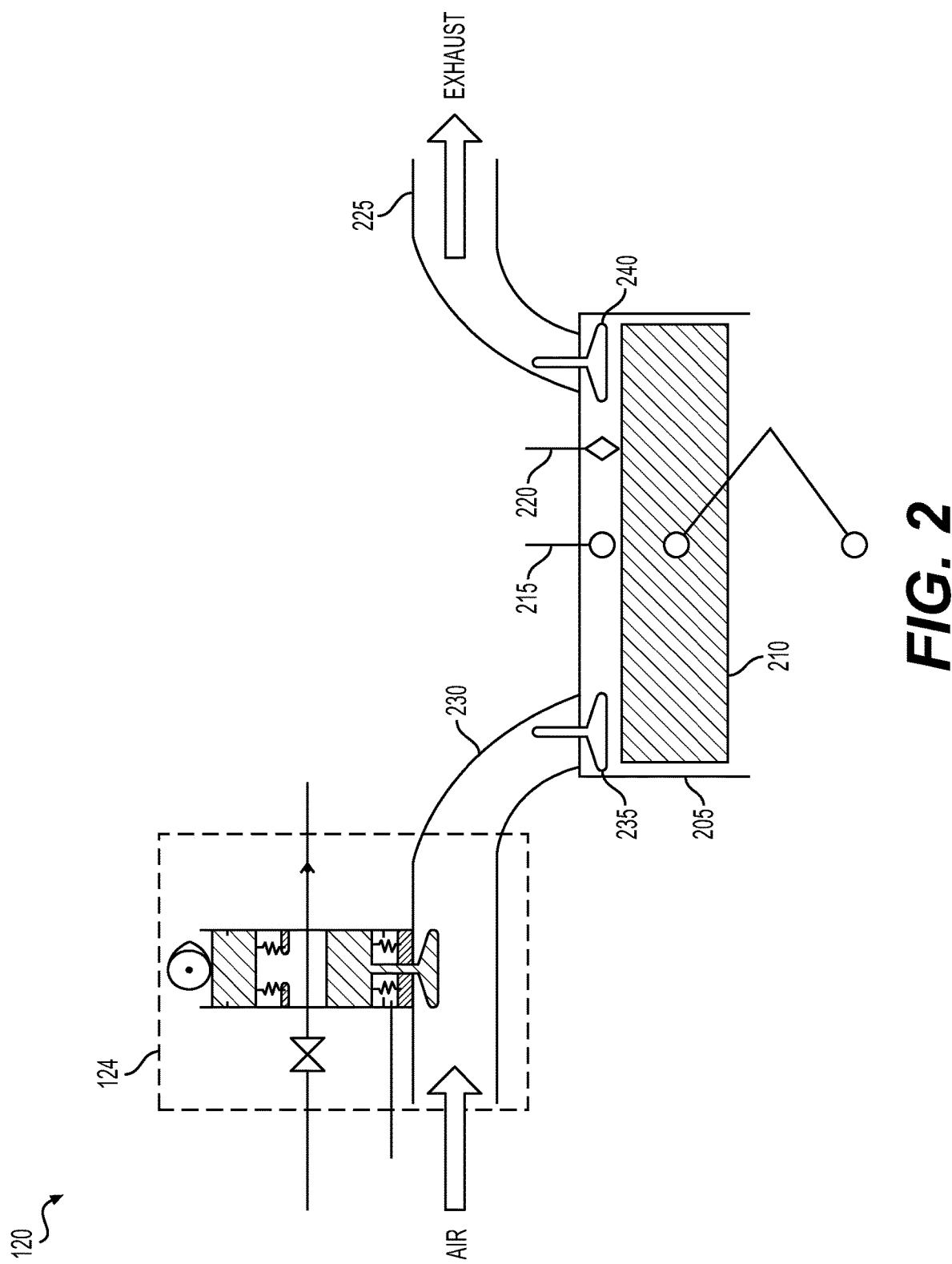
FIG. 2 is a diagram of a natural gas engine with a cam actuated gas admission valve described herein.

FIG. 2 is a diagram of the engine 120. As shown in FIG. 2, the engine 120 may include a combustion cylinder 205. Although a single combustion cylinder 205 is shown, the engine 120 may include multiple combustion cylinders 205 and associated components.

The combustion cylinder 205 may house a piston 210 and a spark plug and/or diesel injector 215. The spark plug and/or diesel injector 215 may enable combustion of a combustible mixture of air and fuel (e.g., air and natural gas) to propel the piston 210, which may provide power for the engine 120 and power system 106. A pressure sensor 220 may be disposed inside of the combustion cylinder 205. The pressure sensor 220 may be communicatively coupled to the engine control module 122 and may provide sensor measurements to the engine control module 122 to control the engine 120 and/or one or more components thereof. The combustion cylinder 205 may be operatively coupled to an exhaust 225 to provide outflow of the air and fuel mixture after combustion, and may be operatively coupled to an intake 230 via which the combustion cylinder 205 may receive the air and fuel mixture for combustion. The intake 230 may be an air intake to the engine 120 that receives fuel via an admission valve coupled to the intake 230 as described in more detail herein.

The intake 230 may be coupled to the gas admission valve assembly 124, which may enable control of fuel that is provided to the intake 230 for mixture with air, and for combustion in combustion cylinder 205, as described in more detail herein. The fuel may be natural gas that may be provided to the intake 230 for mixture with air. The gas admission valve assembly 124 may receive control signals from the engine control module 122 based on pressure measurements performed by the pressure sensor 220. Although a single gas admission valve assembly 124 is shown, multiple gas admission valve assemblies may be included in the engine 120 (e.g., a gas admission valve assembly 124 corresponding to each intake 230 of each combustion cylinder 205). In this way, the engine control module 122 may balance power associated with each combustion cylinder 205 of the engine 120.

The intake 230 may be coupled to the combustion cylinder 205 by an intake valve 235 and may provide the mixture of air and fuel via the intake valve 235, which may be controlled by, for example, the engine control module 122. Similarly, the combustion cylinder 205 may be coupled to the exhaust 225 via the exhaust valve 240, which may be controlled by, for example, the engine control module 122.

As indicated above, FIG. 2 is provided as an example. Other examples are possible and may differ from what is described in connection with FIG. 2.

Figure 3:
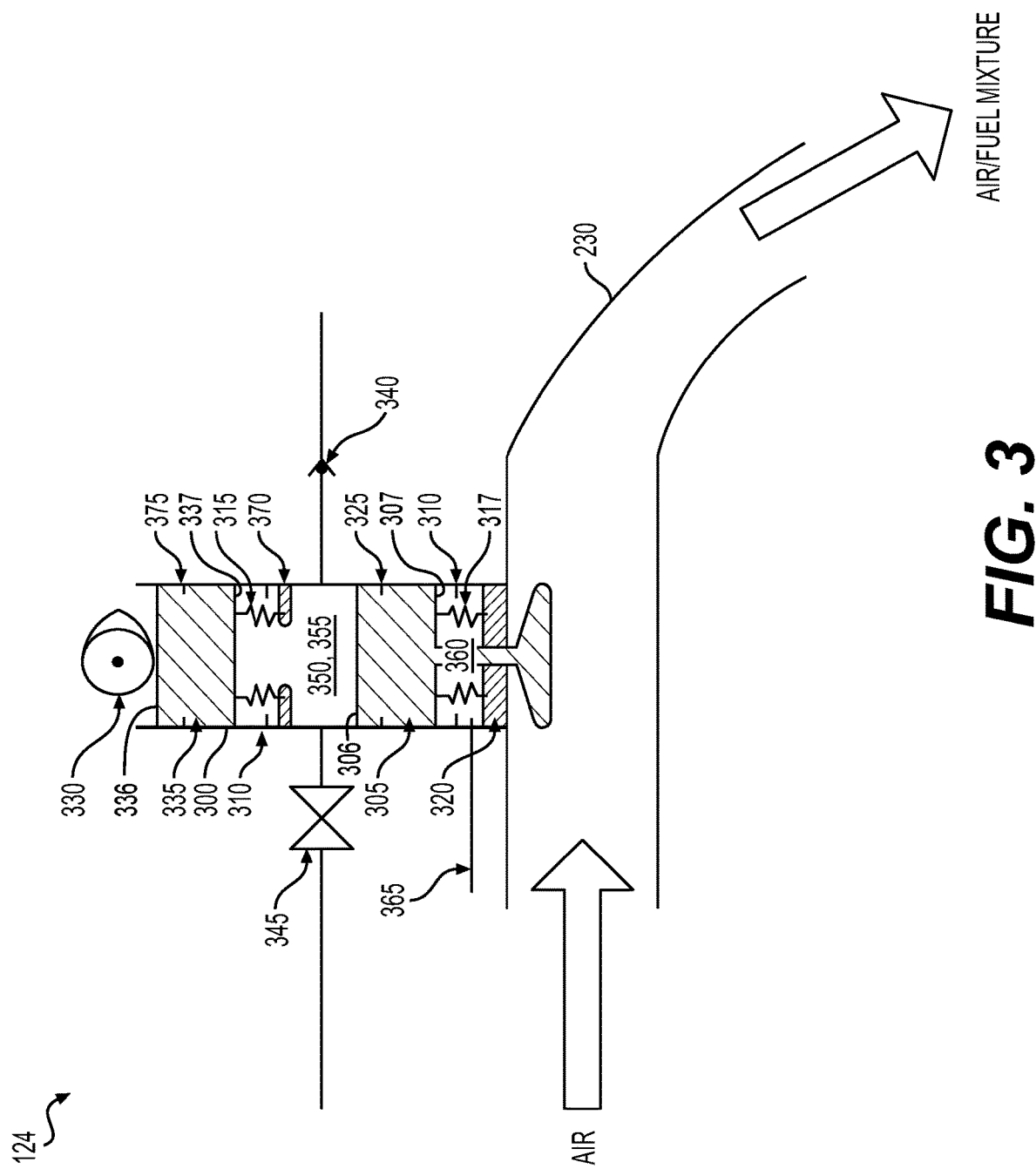
FIG. 3 is a diagram of a cam actuated gas admission valve described herein.

FIG. 3 is a diagram of the gas admission valve assembly 124. As shown in FIG. 3, the gas admission valve assembly 124 may be coupled to the intake 230.

The gas admission valve assembly 124 may include an actuation cylinder 300 that includes an admission valve 305 to provide, for example, natural gas to the intake 230. The actuation cylinder 300 may be actuated to open and close the admission valve 305 (i.e., to decrease or increase, respectively, a rate of injection of natural gas to the intake 230). Motion of the hydraulic piston 335 may be limited by motion limiter(s) 310. Return of the hydraulic piston 335 from an actuated position to a resting position may be achieved by compression and decompression of return spring(s) 315. For example, the hydraulic piston 335 may be actuated toward valve seat(s) 320 to open the admission valve 305 which is connected to second return spring(s)

317, and the hydraulic piston 335 may be actuated away from the valve seat(s) 320 to return the hydraulic piston 335 to proximity with the valve seat(s) 320, thereby closing the admission valve 305. The hydraulic piston 335 may be sealed in the actuation cylinder 300 by one or more seal(s) 325 or oil seals 375. Hydraulic piston 335 may include a top end 336 and a bottom end 337.

The gas admission valve assembly 124 may include a cam 330 that operates to move a hydraulic piston 335 that may hydraulically actuate the hydraulic piston 335, thereby opening and closing the admission valve 305. The hydraulic piston 335 may be coupled to another set of spring supports 370 via another set of return spring(s) 315 to enable return of the hydraulic piston 335 to a resting position after actuation to an actuated position by the cam 330. The hydraulic piston 335 may be sealed in position within the actuation cylinder 300 by oil seals 375.

The actuation cylinder 300 may be coupled to a check valve 340 and an electronic controlled valve 345, which cycle hydraulic fluid 350 into and out of a hydraulic actuation chamber 355. For example, the check valve 340 may be a hydraulic fluid input valve, and the electronic controlled valve 345 may be a hydraulic fluid output valve. Other types of valves are possible. The hydraulic actuation chamber 355 may be a portion of the actuation cylinder 300 defined from the bottom end 337 of the hydraulic piston 335 to a first end 306 (e.g., a top end) of the admission valve 305 that opposes a second end 307 of the admission valve 305 within the actuation cylinder 300. For example, when cam 330 mechanically actuates the hydraulic piston 335, the hydraulic piston 335 may hydraulically actuate hydraulic fluid 350 in the hydraulic actuation chamber 355, which may open or close the admission valve 305.

The hydraulic fluid 350 may be engine lubrication oil, which is cycled into the hydraulic actuation chamber 355 via the check valve 340 and out of the hydraulic actuation chamber 355 via the electronic controlled valve 345. In this case, the electronic controlled valve 345 may receive control signals from the engine control module 122 to control whether hydraulic fluid 350 is in hydraulic actuation chamber 355. For example, when the electronic controlled valve 345 is closed, the hydraulic fluid 350 may be sealed in the hydraulic actuation chamber 355, thereby enabling the cam 330 to cause the admission valve 305 to open. In contrast, when the electronic controlled valve 345 is open, the hydraulic fluid 350 may be expelled via the electronic controlled valve, thereby causing the admission valve 305 to close. In this way, the engine control module 122 may control whether motion of the cam 330 results in opening of admission valve 305 to supply fuel 360 from fuel supply 365 into intake 230, as described in more detail herein.

As indicated above, FIG. 3 is provided as an example. Other examples are possible and may differ from what is described in connection with FIG. 3.

Figure 4:
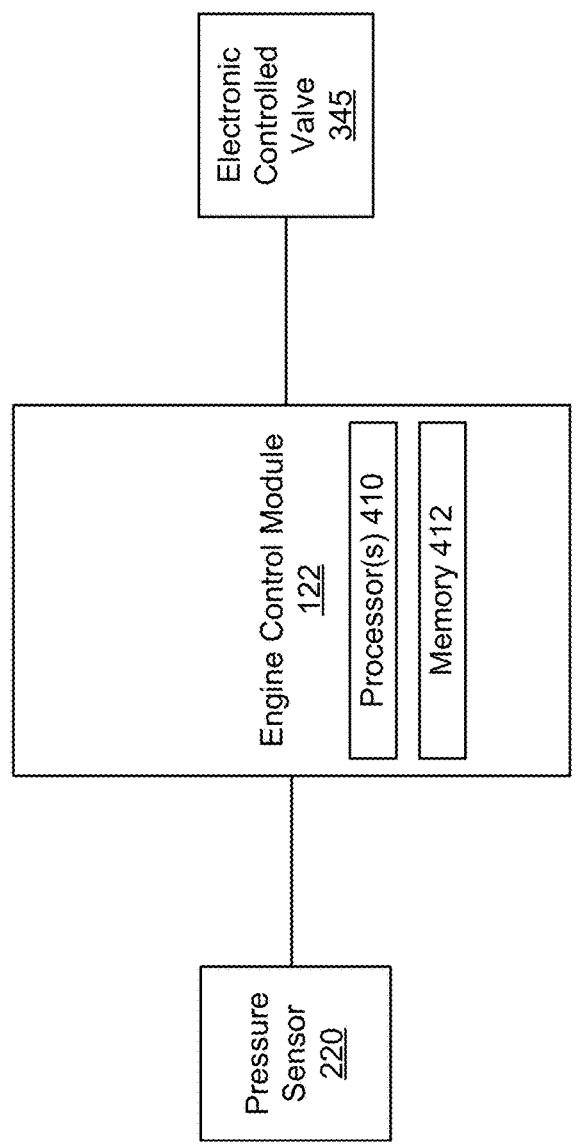
FIG. 4 is a diagram of example components of one or more systems and/or devices described herein.

FIG. 4 is a diagram of an example environment 400 in which systems and/or methods, described herein, may be implemented. As shown in FIG. 4, environment 400 may include the engine control module 122, the pressure sensor 220, and the electronic controlled valve 345. Devices of environment 400 may interconnect via wired connections, wireless connections, or a combination of wired and wireless connections.

The engine control module 122 includes one or more processors 410 (e.g., a microprocessor, a microcontroller, a field-programmable gate array (FPGA), an application-specific integrated circuit (ASIC), and/or the like) and a memory 412 (e.g., read-only memory (ROM), random-access memory (RAM), and/or the like). In some implementations, the engine control module 122 may be an electronic control unit, an engine control unit, and/or the like of the machine 100 and that is configured to control the electronic controlled valve 345. The processor 410 may execute one or more instructions and/or commands to control one or more components of the machine 100, such as to automatically trim the gas admission valve assembly 124 to adjust a rate of natural gas injection via the admission valve 305 of the gas admission valve assembly 124. The memory 412 may store program code for execution by the processor 410 and/or for storing data in connection with execution of such program code by the processor 410.

The engine control module 122 may receive one or more input signals from various components of the machine 100, may operate on the one or more input signals to generate one or more output signals (e.g., by executing a program using the input signals as input to the program), and may output the one or more output signals to various components of the machine 100. For example, the engine control module 122 may receive a set of sensor measurements, such as a pressure measurement form pressure sensor 220, a power measurement identifying an engine power output of combustion cylinder 205, and/or the like. In this case, the engine control module 122 may transmit a control signal to the electronic controlled valve 345 to control whether the hydraulic fluid is disposed in the hydraulic actuation chamber 355, thereby controlling the admission valve 305 of the gas admission valve assembly 124.

The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
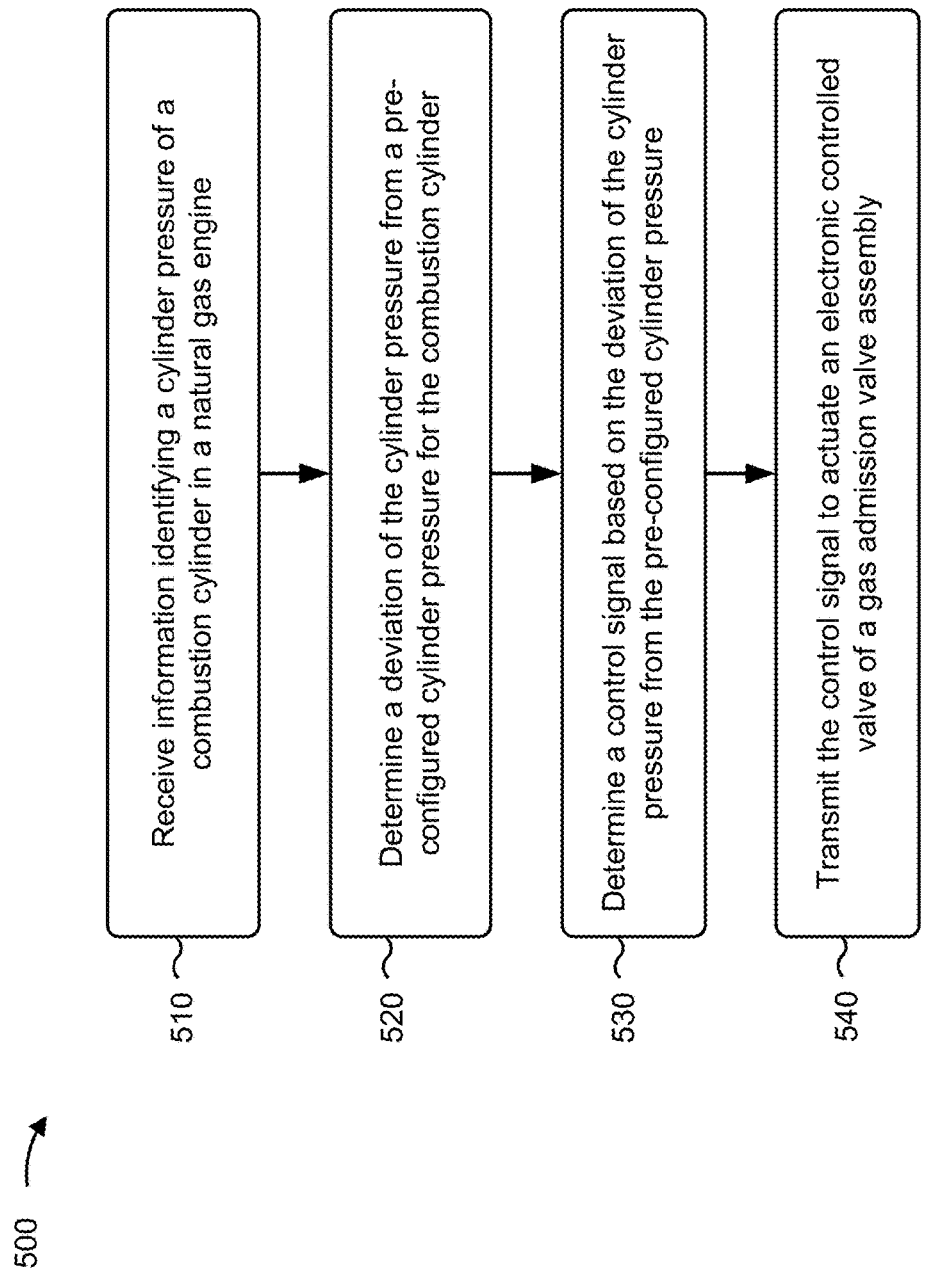
FIG. 5 is a flow chart of an example process for controlling a cam actuated gas admission valve.

FIG. 5 is a flow chart of an example process 500 for controlling a cam actuated gas admission valve. In some implementations, one or more process blocks of FIG. 5 may be performed by an engine control module. In some implementations, one or more process blocks of FIG. 5 may be performed by another device or a group of devices separate from or including the engine control module (e.g., engine control module 122).

As shown in FIG. 5, process 500 may include receiving information identifying a cylinder pressure of a combustion cylinder in a natural gas engine (block 510). For example, the engine control module (e.g., using processor 410, memory 412, and/or the like) may receive a pressure measurement from a pressure sensor (e.g., the pressure sensor 220), as described above. The engine control module may receive information identifying a power output associated with another combustion cylinder. The engine control module may receive information identifying a timing and/or a position of a cam (e.g., the cam 330).

As shown in FIG. 5, process 500 may include determining a deviation of the cylinder pressure from a pre-configured cylinder pressure for the combustion cylinder (block 520). For example, the engine control module (e.g., using processor 410, memory 412, and/or the like) may determine the deviation of the cylinder pressure from the pre-configured cylinder pressure, as described above. The engine control module may determine a deviation of the cylinder pressure from a baseline cylinder pressure, from a pressure of another cylinder, and/or the like.

As shown in FIG. 5, process 500 may include determining a control signal based on the deviation of the cylinder pressure from the pre-configured cylinder pressure (block 530). For example, the engine control module (e.g., using processor 410, memory 412, and/or the like) may determine the control signal (e.g., the pressure sensor 220), as described above. The engine control module may determine the control signal to control the deviation of the cylinder pressure. The engine control module may determine and/or time transmission of the control signal based on a position of a cam (e.g., the cam 330), a timing of the cam, and/or the like. The control signal may be selected to control a turn-on time for the electronic controlled valve 345.

As shown in FIG. 5, process 500 may include transmitting the control signal to actuate an electronic controlled valve of a gas admission valve assembly (block 540). For example, the engine control module (e.g., using processor 410, memory 412, and/or the like) may transmit the control signal to actuate the electronic controlled valve 345, which may open or close the admission valve 305 of the gas admission valve assembly 124, as described above. The engine control module may transmit the control signal to alter whether hydraulic fluid (e.g., hydraulic fluid 350) is in a hydraulic actuation chamber (e.g., hydraulic actuation chamber 355), at a particular angular position of a cam (e.g., the cam 330), a particular timing of the cam, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The disclosed engine control module (e.g., the engine control module 122) may be used with any machine where a technique for controlling injection of a fuel into an engine is desirable, such as to control a power of the engine and/or a cylinder thereof, to control an air/fuel ratio in the engine and/or the cylinder thereof, and/or the like. The disclosed engine control module may determine a pressure in the cylinder of the engine and may transmit a control signal to control a presence of hydraulic fluid in a gas admission valve assembly. In this way, the disclosed engine control module enables balancing of output powers of different cylinders of the engine, control of a pressure within each cylinder of the engine, and/or the like.

As such, the engine control module may adjust a hydraulic fluid pressure in the gas admission valve assembly, thereby allowing variable levels of opening and closing of an admission valve, which may improve trim control of the engine relative to techniques that allow only fixed opening and closing of an admission valve. Further, by using a gas admission valve assembly with an electronic controlled valve to control hydraulic fluid, the engine control module enables reduced costs associated with the engine relative to other types of gas admission valves. Further, the electro-hydraulically actuated valve formed by the gas admission valve assembly may experience reduced wear relative to other types of gas admission valves by using engine lubrication oil as a hydraulic fluid.

What is claimed is:

1. A gas admission valve assembly, comprising:
   an actuation cylinder,
   a hydraulic piston having a top end configured to be actuated by a cam and a bottom end opposite the top end, the hydraulic piston being disposed in the actuation cylinder,
   a check valve to supply a hydraulic fluid to a first portion of the actuation cylinder,
   an electronic controlled valve to remove the hydraulic fluid from the first portion of the actuation cylinder,
   a fuel supply to supply a fuel to a second portion of the actuation cylinder,
   an admission valve to remove the fuel from the second portion of the actuation cylinder, wherein the admission valve includes a body having a first end and a second end opposite the first end, the first end defining an end of the first portion and the second end defining an end of the second portion, the first portion defining a hydraulic actuation chamber that extends from the first end of the admission valve to the bottom end of the hydraulic piston, and
   an electronic control module to control the electronic controlled valve to alter a hydraulic pressure in the first portion of the actuation cylinder and to control whether the admission valve is opened by rotation of the cam.

2. The gas admission valve assembly of claim 1, wherein the hydraulic fluid is engine lubrication oil.

3. The gas admission valve assembly of claim 1, wherein the fuel is natural gas.

4. A gas admission valve system, comprising:
   an air intake for delivering fuel to a natural gas engine, and
   a gas admission valve assembly including:
      an actuation cylinder defining a hydraulic chamber,
      a hydraulic piston to be actuated by a cam towards the hydraulic chamber and disposed in the actuation cylinder,
      a seal to seal the hydraulic piston,
      a first spring connected to the hydraulic piston to bias the hydraulic piston towards the cam, the first spring also being connected between the seal and a spring support within the actuation cylinder,
      a check valve to supply a hydraulic fluid to a first portion of the actuation cylinder,
      an electronic controlled valve to remove the hydraulic fluid from the first portion of the actuation cylinder,
      a fuel supply to supply the fuel to a second portion of the actuation cylinder,
      an admission valve to remove the fuel from the second portion of the actuation cylinder, and
      a second spring connected to the admission valve to bias the admission valve towards the cam, the second spring extending between a valve seat and a body of the admission valve,
   an electronic control module to control the electronic controlled valve to alter a hydraulic pressure in the first portion of the actuation cylinder and to control extent of movement of the admission valve,
   wherein the admission valve delivers fuel to the air intake of the natural gas engine.

5. The gas admission valve system of claim 4, wherein the electronic control module is configured to control the electronic controlled valve to alter an air/fuel ratio of a combustion cylinder of the natural gas engine.

6. The gas admission valve system of claim 4, wherein the electronic control module is configured to control the electronic controlled valve based on a pressure measurement associated with a combustion cylinder of the natural gas engine.

7. The gas admission valve assembly of claim 1, wherein the electronic control module is configured to close the electronic controlled valve to increase a rate of injection of the fuel via the admission valve.

8. The gas admission valve assembly of claim 1, wherein the electronic control module is configured to open the electronic controlled valve to decrease a rate of injection of fuel via the admission valve.

9. The gas admission valve assembly of claim 1, wherein the electronic control module is configured to actuate the electronic controlled valve at any angular position of the cam.

10. The gas admission valve system of claim 4, wherein the hydraulic fluid is engine lubrication oil.

11. The gas admission valve system of claim 4, wherein the electronic control module is configured to close the electronic controlled valve to increase a rate of injection of the fuel via the admission valve.

12. The gas admission valve system of claim 4, wherein the electronic control module is configured to open the electronic controlled valve to decrease a rate of injection of fuel via the admission valve.

13. A gas admission valve assembly, comprising:
  an actuation housing,
  a hydraulic piston having a top end configured to be actuated by a cam and bottom end opposite the top end, the hydraulic piston being disposed in the actuation housing,
  an electronic controlled valve to alter a quantity of hydraulic fluid in a first portion of the actuation housing,
  a fuel supply to supply a fuel to a second portion of the actuation housing,
  an admission valve to remove the fuel from the second portion of the actuation housing, the first portion defining a hydraulic actuation chamber that extends from a first end of the admission valve to the bottom end of the hydraulic piston, and
  an electronic control module to control the electronic controlled valve to alter a hydraulic pressure in the first portion of the actuation housing based on a pressure measurement received from a pressure sensor, the pressure measurement being associated with a combustion cylinder of an internal combustion engine.

14. The gas admission valve assembly of claim 13, wherein the hydraulic fluid is engine lubrication oil.

15. The gas admission valve assembly of claim 13, wherein the fuel is natural gas.

16. The gas admission valve assembly of claim 13, wherein the electronic control module is configured to close the electronic controlled valve to increase a rate of injection of the fuel via the admission valve.

17. The gas admission valve assembly of claim 13, wherein the electronic control module is configured to open the electronic controlled valve to decrease a rate of injection of fuel via the admission valve.

18. The gas admission valve assembly of claim 13, wherein the electronic control module is configured to actuate the electronic controlled valve at any angular position of the cam.

* * * * *